June 10, 1969 R. E. BROWN 3,449,688

MEANS FOR IMPROVING THE OPERATING CHARACTERISTICS
OF SWITCHING DEVICES

Filed Jan. 6, 1966

INVENTOR.
RAYMOND E. BROWN
BY Charles B. Haverstock
ATTORNEYS

United States Patent Office 3,449,688

Patented June 10, 1969

3,449,688

MEANS FOR IMPROVING THE OPERATING CHARACTERISTICS OF SWITCHING DEVICES

Raymond E. Brown, Hazelwood, Mo., assignor, by mesne assignments, to McDonnell Douglas Corporation, St. Louis County, Mo., a corporation of Maryland Filed Jan. 6, 1966, Ser. No. 519,028
Int. Cl. H03f 3/68
U.S. Cl. 330—30 12 Claims

ABSTRACT OF THE DISCLOSURE

A switching circuit having solid state elements including at least one field effect device connected between an input source and an output, said circuit including means for making the offset voltage characteristics of the field effect device independent of the characteristics of the input source.

The subject invention relates generally to switching devices and circuits and more particularly to an analog switching device having improved performance characteristics.

Many switching devices including analog switching devices have been constructed and used heretofore. The known analog switching devices and circuits, however, have been subject to undesirable variations and changes in their operation conditions, and to date electronic switches have exhibited large undesirable off-set voltages and currents. For the most part, the known analog switching devices are also relatively complicated and expensive to construct and are unsuitable for many purposes. The subject switching means overcome these and other disadvantages and shortcomings of the known switching means. For example, the subject switching means have relatively non-varying operating conditions, they exhibit low off-set voltages and currents, they are fast acting and require very little power to operate, and they are relatively inexpensive to construct and install.

The subject analog switch means comprise a circuit having an input, an output, an active element such as a semi-conductor element connected in series between the input and output, a second active element connected in the circuit across the input and/or the output, means for selectively reversibly changing the conducting conditions of the active elements, and means connected in the circuit to stabilize the resistance of the series connected active element, said last named means including means for stabilizing a preselected circuit voltage.

It is a principal object of the present invention to provide improved analog switch means.

Another object is to improve the impedance and voltage characteristics of analog switching devices and the like.

Another object is to provide a switching circuit employing solid state elements which is fast acting, reliable, and has relatively stable and predictable operating characteristics.

Another object is to reduce the power required to operate a switching circuit.

Another object is to provide an analog switching circuit employing solid state elements which circuit has relatively low off-set voltage and low current characteristics.

Another object is to provide a versatile switching circuit having many possible uses and applications including computer applications, multiplexer applications, applications employing summing amplifiers and other such components, and in a wide variety of control circuits and the like.

These and other objects and advantages of the present invention will become apparent after considering the following detailed specification which describes in detail several different embodiments of the subject switching means in conjunction with the accompanying drawings, wherein.

Figure 1:
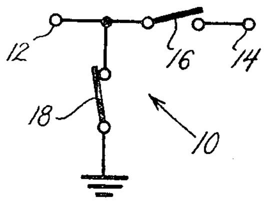
FIG. 1 is a simplified diagram of a switching circuit.

Referring to the drawings more particularly by reference numbers, the number 10 in FIG. 1 refers to a simplified switching circuit having an input 12, and an output 14, a first switching device 16 connected in series between the input and the output, and a second switching device 18 connected in parallel to ground across one or both the input and the output. When the switch 16 is open and the switch 18 closed, the circuit is in its "off" condition; and when the condition of the switches is reversed the circuit is "on." When the switch circuit 10 is "off" as shown in FIG. 1, there is relatively low impedance between the input 12 and ground, and relatively high or infinite impedance between the input 12 and the output 14. When the switch is "on" the reverse is true and there is relatively high or infinite impedance between the input 12 and ground and relatively low impedance between the input and the output. Switches of the general type shown in FIG. 1 have been used in many applications and have employed mechanical, electromechanical and other kinds of switching devices including relays and the like. Such devices are complicated and expensive and are too slow operating and too unreliable for many applications.

The present invention teaches the construction and operation of an improved switching circuit of the general type described above but which is much faster acting and more reliable. The present improved switching circuit preferably employs solid state elements such as transistors including field effect and other types of transistors and the like. In the past, when solid state elements have been used in switching circuits and particularly in analog switching circuits, the circuits have been unstable and have produced excessive off-set voltages.

Figure 2:
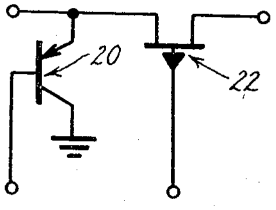
FIGS. 2, 3 and 4 show other simplified switching circuits constructed according to the present invention.
Figure 3:
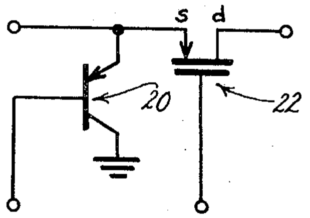

FIGS. 2 and 3 show switching circuits employing solid state devices for the switching elements. In these constructions transistor 20 is provided for one of the switching elements, which transistor exhibits relatively low saturation resistance and relatively low voltage when the circuit is in its "off" condition. The transistor 20 preferably also has a relatively low leakage current characteristic when the switch circuit is "on." Transistor 22 is connected in series between the input and output and has a relatively low resistance (or impedance) characteristic when the switch is "on" and a relatively high resistance characteristic when the switch is "off." The transistor 22 also preferably has relatively low leakage current properties. The transistors 20 and 22 can both be field effect transistors although other types of transistors can also be used. In the construction shown in FIG. 2, the transistor 22 is shown as a diffused silicon P channel, and in the construction shown in FIG. 3 the transistor 22 is a P channel metal oxide silicon field effect transistor. A metal oxide silicon field effect transistor has the further advantage of having an extremely high gate-to-body resistance which virtually eliminates leakage currents. These particular devices are well known and are shown for illustrative purposes.

Figure 4:
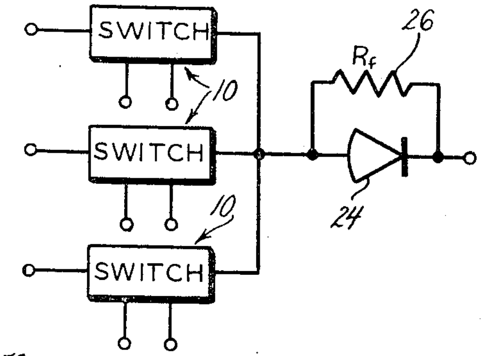

FIG. 4 illustrates in the block diagram form a typical circuit employing analog switches incorporating the novel features of the present invention. In FIG. 4 the switch circuits 10 are shown connected having separate input circuits, and the outputs of all the switch circuits are connected in common to the input of an operational amplifier circuit such as the amplifier 24. The amplifier 24 is such as might be employed in an analog control circuit or the like, and resistor 26, labeled $R_f$, is shown connected across the amplifier 24. The gain of the amplifier circuit 24 can be expressed by the ratio $R_f/R_{in}$ wherein $R_{in}$ is the total circuit input resistance.

Figure 5:
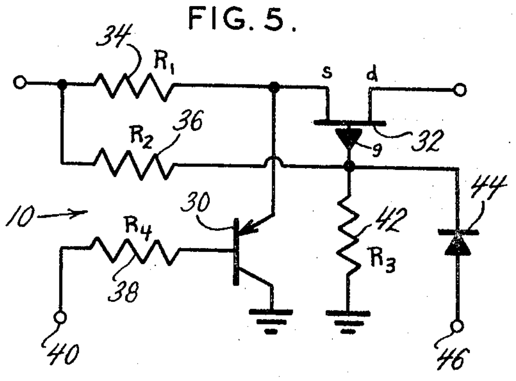
FIG. 5 is a schematic circuit diagram showing the details of a switching circuit constructed according to the present invention; and, FIGS. 6–9 show other forms of switching circuits employing the teachings of the present invention.

The construction of the switch circuits 10 in FIG. 4 is shown in FIG. 5. Each switch circuit includes a junction transistor 30 and a field effect transistor 32 connected in the circuit as shown. Each switch circuit also has an input resistor 34 (labeled $R_1$), a stablizing resistor 36 ($R_2$) the purpose of which will be described later, another resistor 38 ($R_4$) which is connected to the base electrode of the transistor 30 and to a first drive circuit connection 40, another resistor 42 ($R_3$) connected to the gate electrode *g* of the transistor 32 and to one side of the resistor 36, and a diode 44 which has one side connected to the gate *g* of transistor 32 and its opposite side connected to a second drive input 46.

The input resistance $R_{in}$ in the switch circuit shown in FIG. 5 is the total resistance, when the switch is "on," of the resistor 34 ($R_1$) and the "on" resistance between the source *s* and drain *d* electrodes of transistor 32. This "on" resistance will be referred to as the resistance $R_{ds}$. In order for the gain of the amplifier circuit of FIG. 4 to remain constant for both polarities of input voltage, the "on" resistance $R_{ds}$ must remain constant. The "on" resistance of field effect transistors and like devices, is in large measure controlled by the voltage on the gate electrode *g*. If the gate voltage increases the "on" resistance $R_{ds}$ will be increased and vice versa. If it is assumed in the circuit of FIG. 5 that the field effect transistor 32 has a symmetrical construction and *d* is held to zero, then the gate bias voltage can be expressed as being equal to one-half of the voltage across the *s* and *d* electrodes less the voltage on the gate element $V_g$ or $\frac{1}{2}(V_s-V_g)$. In a circuit such as shown in FIG. 4, the amplifier 24 and feedback resistance 26 will maintain the connection between the switch and the amplifier at zero. The voltage between the *s* and *d* electrodes can also be expressed as equal to the current through the transistor 32 times the "on" resistance $R_{ds}$ or as $IR_{ds}$.

The purpose of the subject switch circuits is to switch one or more signals to an amplifier or other circuit. When the switch circuit of FIG. 5 is "on," that is when the transistor 32 is conducting or passing a signal to the amplifier, the transistor 30 is in a non-conducting condition. Under these conditions the drive voltage at drive connection 46 is negative and the diode 44 is in a non-conducting condition. Under these same conditions, with the switch circuit outside of any feedback path, the omission of the resistor 36 from the circuit would cause the voltage on the gate electrode *g* of the transistor 32 to be zero, and would also cause the bias voltage to be equal to half the difference betwen the voltages on the source electrode *s* and the drain electrode *d*. This bias voltage would also be equal to half the normal current through the transistor 32 times the "on" resistance $R_{ds}$. Thus without the resistor 36 in the circuit of the off-set voltage between the source and the drain electrodes would be a function of the input signal, and would cause undesirable variations in the gain of the amplifier 24 or other device connected in the output.

On the other hand, by including the resistor 36 and selecting its resistance value by the equation $$R_2=\frac{\left[R_1+\frac{R_{ds}}{2}\right]}{R_{ds/2}}R_3=\left[\frac{2R_1+R_{ds}}{R_{ds}}\right]R_3$$

the off-set voltage and other circuit characteristics are substantially improved. If, in the above equation the resistance of the resistor 34 ($R_1$) is selected to be much greater than the transistor "on" resistance $R_{ds}$ then the resistance of the resistor 36 ($R_2$) would approximately equal $$R_2=\frac{2R_1R_3}{R_{ds}}$$

Under these circuit conditions the gate voltage $V_g$ on the gate electrode *g* can be expressed by the equation $$V_g=\frac{R_3V_{in}}{R_3+\frac{2R_1R_3}{R_{ds}}}$$

If the quantity $2R_1R_3/R_{ds}$ is selected to be much bigger than $R_3$ by itself, then the gate voltage $V_g$ will approximately equal $$\frac{V_{in}}{\frac{2R_1}{R_{ds}}}$$

Recalling that the off-set voltage across the electrodes *d* and *s* is equal to $V_s-V_d=V_s$ for $V_d=0$ it can be further stated that $V_s=IR_{ds}$. Again applying the assumption that $R_1$ is much larger than $R_{ds}$, $V_s$ can be said to equal $V_{in}R_{ds}/R_1$. The gate bias voltage of the field effect transistor 32 was previously defined as equal to $$\frac{V_s-V_g}{2}$$

With the addition into the circuit of the resistor $R_{36}$ ($R_2$), the expression $$\frac{V_s}{2}=\frac{V_{in}R_{ds}}{2R_1},\text{ and }V_g=\frac{V_{in}R_{ds}}{2R_1}$$

The gate bias voltage is equal to the difference between these identical quantities or equal to zero. This means that the gate bias voltage of the field effect transistor 32 is no longer a function of the input voltage. This is important to the improved operation and is due in large part to the addition to the circuit of the resistor 36.

For some applications, small leakage currents in the transistor 32 cannot be tolerated. With the subject circuit, it is possible to cancel these out by applying a suitable biasing current to the drain electrode *d*. A proper bias will reduce the leakage to zero when the switch is in its "off" condition. A small bias applied to the source electrode *s* can also be used to reduce the leakage to zero when the switch circuit is in its "on" condition.

Figure 6:
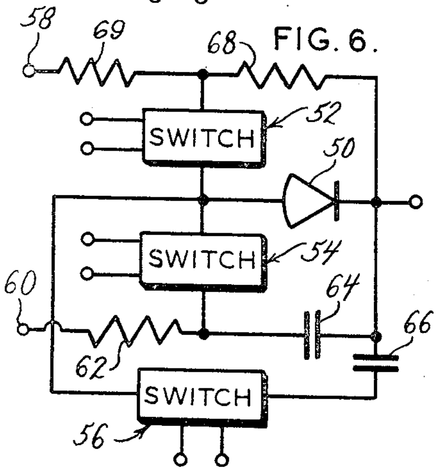

FIG. 6 shows another form of circuit employing analog switches constructed according to the present invention but not requiring a resistor similar to $R_{36}$ above. In the circuit of FIG. 6 the operating mode of an amplifier 50 is controlled by one or more switch circuits connected as shown. The circuit as shown has three possible operating modes obtainable by applying proper drive voltages to the switch circuits 52, 54 and 56. The switch circuit 52 is for "track drive" and is controlled by a track input 58 and suitable drive means. The switch 54 is the operating drive and is controlled by operating inputs on lead 60. The inputs to the operating drive switch circuit 54 are also integrated by an integrating circuit which includes resistor 62 and capacitor 64. The switch circuit 56 is the "hold" drive switch and is controlled by a signal from the output of the amplifier 50 which passes through a "hold" capacitor 66. A track resistor 68 is also connected between the output of the amplifier 50 and the track input on lead 58, and the track input may also have another resistor 69.

Figure 7:
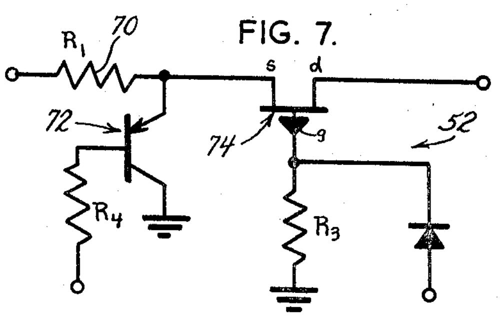

In the "track" mode of operation the output of the amplifier 50 follows the track input signals received on lead 58. In the "operate" mode the amplifier 50 will operate on an integrated form of the input signals received on the operating input lead 60, and in the "hold" mode the amplifier output will retain the same output that it had at the time that it was switched into the "hold" mode. The details of the switching circuits 52, 54 and 56 are illustrated more specifically by the diagram of FIG. 7 although other forms of switching devices could also be used such, for example, as the switching circuit shown in FIG. 5. There is no resistor in the circuit of FIG. 7 that is equivalent to the resistor 36 in FIG. 5. The reason for this is that the resistance of the switch circuits in the circuit of FIG. 7 is between the summing junction of the switch circuits and the grid of the amplifier circuit 50. In other words, the switch circuits are connected inside of the summing junction so that the channel resistance does not matter. In this case the input resistor 70 is equivalent to resistor 34 in FIG. 5 and is intentionally selected to be relatively small since its main purpose is simply to limit the current that flows through the transistor 72 when the switch circuit is "off." The circuit of FIG. 7 may also include bias means connected to the source and/or drain electrodes of the field effect or other transistor to cancel small leakage currents as aforesaid.

An off-set voltage and a switching spike appears in the output of the amplifier circuit of FIG. 6 when the amplifier is switched between modes. The off-set voltage is caused primarily by the transfer of charge from the gate drain capacity of the series transistor to the feedback capacitor that is being switched in. The value of this can be expressed by the equation:

$$e_{\text{offset}}=\frac{C_{gd}}{C}V_d$$

Where:

$e_{\text{offset}}$ is the offset voltage $C_{gd}$ is the gate to drain capacity of the series transistor.

C is the value of the feedback capacity being connected to the input of the amplifier.

$V_d$ is the amplitude of the control signal applied to lead 46 of FIG. 5.

This off-set voltage may be cancelled by applying a signal of opposite polarity through a capacitance to the source terminal of the series transistor. The second cause of off-set voltage and the switching spikes is allowing the amplifier to operate without feedback during the switching time. This can be eliminated by providing a short time delay (on the order of 1 microsecond) between the time a feedback element is switched in and the previous feedback element is switched out. By use of the metal oxide silicon transistors as shown in FIG. 9 and allowing a one microsecond overlap in the mode switching, the off-sets and spikes are extremely low compared to all other presently known switches that have the speed required in modern computers.

Figure 8:
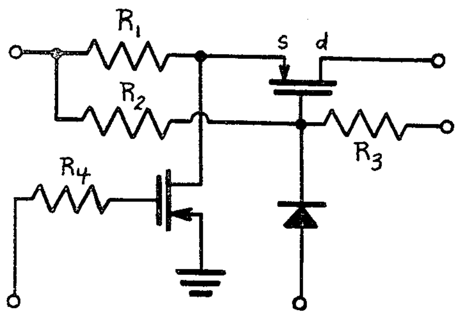
Figure 9:
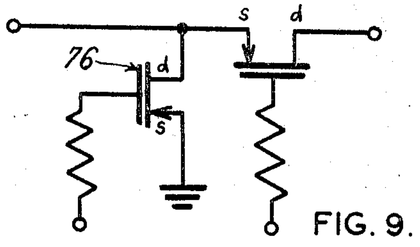

The analog switch circuits shown in FIGS. 8 and 9 are similar to the circuits already described. In both of these circuits the selected transistors are P channel metal oxide silicon transistors which are characterized by having relatively low leakage current. Circuits of this general type have broad use and can be used in many applications such as in analog computer circuits without any special provision for leakage compensation. The circuit shown in FIG. 8 could be used in a circuit such as that illustrated in FIG. 4, and the circuit shown in FIG. 9 could be used in a circuit such as is illustrated in FIG. 6. The provision in the circuit of FIG. 9 of a metal oxide silicon field effect transistor for the shunt active element 76 has the advantage of eliminating extraneous current due to base-emitter leakage. It also eliminates the drive-to-signal coupling caused by the base storage of junction transistors.

It should now be apparent that the subject analog switching means are versatile and can operate relatively independently of variations of the input signals which are fed to them. Furthermore, the subject switches are able to maintain an output which is uniform, stable and reliable in all operating conditions. These improved operating characteristics are obtained in large part by proper selection of the circuit elements and the parameters thereof which make the operating characteristics independent of the input signal conditions. For example, the improved operating characteristics of the switch circuit shown in FIG. 5 are due in large part to the addition to the circuit of the resistor 36 which stabilizes the resistance and voltage characteristics of the field effect transistor 32 and enables the transistor 32 to operate independently of the characteristics of the inputs and at lower off-set voltages than known prior art switch circuits including those employing solid state devices. The subject switch circuits are also compatible with integrated circuit techniques and therefore can be made smaller and more compact than any known analog switch devices. Furthermore, analog switches constructed using field effect devices are relatively less sensitive and less critical to small shifts and variations in the characteristics of the circuit elements including the active elements.

Analog switch circuits constructed according to the present disclosure are useful in many places including data handling systems such as are employed in multiplexers, sample and hold devices, modulators and chopper circuits, analog-to-digital converters, analog computers, and in many other places. In such devices the subject analog switches are able to either transmit a signal without distortion or completely block it. This is different from digital switches which transmit only the state of a device and are not as concerned with distortion. The subject circuit therefore makes for more reliable analog switching than has been possible heretofore with known and available switching devices. Furthermore, the subject switches provide relatively low impedance and therefore produce very little loss and require very little current to operate.

Various other types of semi-conductors and other circuit elements can also be used for the active and other circuit components of the subject switch circuits. For example, PNP and NPN type transistors can be used for the transistor 72 in FIG. 7 and for the corresponding component in the other illustrated circuits; and N channel field effect transistors can be used for the transistor 74 and its counterpart in other of the circuits. When different types of semi-conductors are used, however, care must be exercised to observe polarity requirements and to compensate for leakage and off-set voltages. Networks are usually also provided to achieve the desired frequency response and switching speeds.

Thus there has been shown and described novel analog switch means which fulfill all of the objects and advantages sought therefor. Many changes, modifications, variations, and other uses and applications of the subject means will, however, become apparent to those skilled in the art after considering this specification and the accompanying drawings which disclose several preferred embodiments. All such changes, modifications, variations, and other uses and applications which do not depart from the spirit and scope of the invention are deemed to be covered by the invention which is limited only by the claims which follow.

What is claimed is:

1. An analog switching circuit comprising a circuit input, a circuit output, a first active element connected in series between the input and the output, a second element connected across the input, said first and second active elements each having a control electrode, control means including a source of control input signals connected to the control electrodes of said first and second active elements and operable to cause one of said active elements to be in a conducting and one in a non-conducting condition, said source of control inputs includig meas for reversig the conducting conditions of said elements, and impedance means connected in the circuit between the input and the control electrode of said first active element, the impedance of said impedance means being selected to make the impedance characteristics of said first element substantially independent of the characteristics of the circuit input.

2. The analog switching circuit defined in claim 1 wherein said first and second active elements are semiconductor elements, said first active element having a source, a drain, and a gate control electrode, said impedance means including a resistor element connected between the circuit input and the gate electrode of said first active element.

3. The analog switching circuit defined in claim 2 wherein the impedance of said resistor is inversely related to the impedance between the source and drain electrodes of said first active element when said first active element is in its conducting condition.

4. The analog switching circuit defined in claim 1 wherein said first active element is a field effect device having source, drain, and gate electrodes, means biasing at least one of said electrodes to produce a predetermined operating condition of said first element, said biasing means including a first resistor connected between the circuit input and the gate electrode, and a second resistor connected between the gate electrode and ground, the resistances of said first and second resistors being selected to be in direct proportional relationship to each other.

5. The analog switching circuit defined in claim 1 wherein said control means include first drive means including a first source of control input signals connected to control the first active element and second drive means including a second source of control input signals connected to control the second active element.

6. Control circuit means including an amplifier circuit having an input, an output, and input signal means connected to the amplifier input, said input signal means comprising an analog switch circuit having an input connection, an output connection, an active element connected in series between the input and output connections, and a second active element connected between the input connection and ground, control means including a source of control input signals connected to cause one of said active elements at a time to conduct, said control means including means for reversing the conducting conditions of said active elements, each of said active elements having an input electrode, an output electrode and a control electrode, and impedance means connected between the control electrode of the series connected active element and the input connection thereto, the impedance of said impedance means being inversely related to the impedance characteristics of said series connected active element when said active element is in conducting condition to make the gate bias voltage on the control electrode of said one active element independent of the characteristics of signals present at the input connection to said analog switch circuit.

7. The control circuit defined in claim 6 wherein said one active element in said switch circuit is a field effect device.

8. The control circuit defined in claim 6 wherein a plurality of similar analog switch circuits are provided, the input connections of said switch circuits being connected to different distinct input signal sources and the output connections of said switch circuits being connected in common and to the input of the amplifier circuit.

9. An analog control circuit comprising a functional circuit having an input and an output, and an analog switch circuit connected to the input of said functional circuit to control the operation thereof, said switch circuit having a switch input connection to a source of input signals, a switch output connection connected to the input of the functional circuit, a first active element connected between the switch input and the switch output, a second active element connected between the switch input and ground, each of said active elements having an input electrode, an output electrode, and a control electrode, separate drive means connected to the control electrodes of each of said active elements to control the operation thereof, said drive means operating to cause one of said active elements at a time to be in a conducting condition, and impedance means connected between the control electrode of said first active element and the switch input connection, the impedance of said impedance means being selected to be inversely proportional to the impedance of said first active element when said element is in its conducting condition.

10. The analog control circuit defined in claim 9 wherein an impedance device is connected in series in the input to the first active element, the impedance of the aforesaid impedance means being selected to be directly proportional to the impedance of said impedance device.

11. An analog switching circuit comprising an input, an output, a first active element including a metal oxide field effect transistor connected in series between the input and the output, a second active element including a second metal oxide field effect transistor connected across the input, control means operable to cause one of said active elements to be in a conducting condition and one in a non-conducting condition, and means to reverse the conducting conditions of said active elements.

12. A control circuit comprising an amplifier circuit having an input and an output connection, a plurality of similar switching circuits connected to control said amplifier circuit, each of said switching circuits having a distinct input and an output connected to the input of the amplifier circuit, each of said switching circuits also having a first active element connected in series between its input and output, a second active element connected between its input and ground, said first and second active elements in each of said switching circuits including a metal oxide field effect device characterized by having relatively low leakage characteristics, each of said active elements having a control electrode, and control means including a source of control input signals connected to the control electrodes of said first and second active elements in each of said switching circuits including means to cause one of said first and second active elements in each switching circuit to be in a conducting condition and the other active element to be in a non-conducting condition, said control means including means for reversing the conducting conditions of said active elements.

References Cited

UNITED STATES PATENTS

| | | | |
|---|---|---|---|
| 2,956,272 | 10/1960 | Cohler et al. | 307—254 X |
| 3,153,729 | 10/1964 | Leaky | 307—253 |
| 3,275,852 | 9/1966 | Jursik | 307—254 X |

OTHER REFERENCES

Shipley: "Analog Switching Circuits Use Field-Effect Devices," Electronics, pp. 45–49, Dec. 28, 1964.

ROY LAKE, *Primary Examiner.*

LAWRENCE J. DAHL, *Assistant Examiner.*

U.S. Cl. X.R.

307—248